US012364296B1

(12) United States Patent
Obregon

(10) Patent No.: US 12,364,296 B1
(45) Date of Patent: Jul. 22, 2025

(54) ILLUMINATED APPARATUS INCLUDING ATTACHMENT MEANS FOR ATTACHMENT TO APPAREL

(71) Applicant: Richard Obregon, Chatsworth, CA (US)

(72) Inventor: Richard Obregon, Chatsworth, CA (US)

( * ) Notice: Subject to any disclaimer, the term of this patent is extended or adjusted under 35 U.S.C. 154(b) by 28 days.

(21) Appl. No.: 18/410,197

(22) Filed: Jan. 11, 2024

(51) Int. Cl.
*A41D 27/08* (2006.01)
*F21V 33/00* (2006.01)

(52) U.S. Cl.
CPC ........ *A41D 27/085* (2013.01); *F21V 33/0008* (2013.01)

(58) Field of Classification Search
CPC .......................... A41D 27/085; F21V 33/0008
USPC .................................................. 362/103, 190
See application file for complete search history.

(56) References Cited

U.S. PATENT DOCUMENTS 9,618,193 B1 * 4/2017 Lord ........................ A42B 1/24
2011/0025195 A1 * 2/2011 Govender ........... F21V 33/0008 313/504
2015/0170480 A1 * 6/2015 Chen .................. F21V 33/0008 362/396
2019/0246719 A1 * 8/2019 Patz ...................... F21V 23/005

* cited by examiner

*Primary Examiner* — Keith G. Delahoussaye
(74) *Attorney, Agent, or Firm* — Avakian IP

(57) ABSTRACT

An apparatus for attachment to apparel incorporating an illumination element for illuminating interchangeable emblems, which may be attached to the face of the illumination element, wherein the apparatus may be reconfigured upon the apparel and attached to other pieces of apparel without issue.

8 Claims, 4 Drawing Sheets

ILLUMINATED APPARATUS INCLUDING ATTACHMENT MEANS FOR ATTACHMENT TO APPAREL

CROSS-REFERENCE TO RELATED APPLICATION(S)

This application relates, and claims priority, to U.S. Provisional Application Ser. No. 63/321,908, filed Mar. 21, 2022, the entire disclosure of which is incorporated by reference herein in its entirety.

BACKGROUND

The present disclosure relates to illuminated apparel. More particularly, the present disclosure relates to a device and system for creating illuminated apparel bearing the markings of a sports team, logo, or other desired signs, wherein the logo is interchangeable, thus reducing the need for redundant illumination components for illuminating the logo.

Pride in sports teams, companies, or other logos and signs is ramped in society. Whether it's cheering for the professional team or at the local level, individuals enjoy displaying and associating with a 'team'. This is evident in the tremendous number of sports team apparel sold each year, as well as other goods.

One way in which to make a piece of apparel or an individual stand out is to use illumination to show off the apparel or parts of the apparel or an individual in a darkened area. This can be done in a number of way, for example blinking LED buttons or the like can be attached to the apparel. While these LEDs have wonderful effects, they are small and limited in their light output and the effects that they provide. Elongated light elements, such as chemiluminescent light sticks or lights of all types attached in an elongated manner such as strings of lights, strands, or electro-luminescent wire can also provide stimulating effects. However, to date, the only way in which to affix the light elements is to sew the elements directly to the apparel. Although the effects are outstanding, the only way in which to change or modify the apparel is to cut the stitching and re-sew or re-stitch the light element to the apparel, which is daunting and unlikely.

This is both time consuming and can be destructive to the apparel. Moreover, on certain apparel items such as hats, caps, belts or the like, it may be difficult or just not feasible to attach the elements by sewing or stitching.

Accordingly, there is a need for a device that permits mounting light elements to apparel items and preferably lighting a 'logo' or other feature on the apparel. Desirably, such a device is readily applied to the apparel item without sewing, stitching or the like. More desirably still, such a device is removable and re-applicable to redesign or remake the lighting effects on the apparel item.

BRIEF DESCRIPTION OF DRAWINGS

The accompanying drawings, which are incorporated in and constitute a part of the specification, illustrate exemplary embodiments of the present disclosure.

DETAILED DESCRIPTION

The following description of exemplary embodiment(s) is merely illustrative in nature and is in no way intended to limit the disclosure, its application, or uses.

In the following description, reference is made to the accompanying drawings which are illustrations of embodiments in which the disclosed invention may be implemented and practiced. It is to be understood, however, that those skilled in the art may develop other structural and functional modifications without departing from the novelty and scope of the instant disclosure.

The terms first, second, third, etc. may be used herein to describe various elements, components, regions, parts and/or sections. It should be understood that these elements, components, regions, parts and/or sections are not limited by these terms of designation. These terms of designation have been used only to distinguish one element, component, region, part, or section from another region, part, or section. Thus, a first element, component, region, part, or section discussed below could be termed a second element, component, region, part, or section merely for purposes of distinction but without departing from structural or functional meaning.

Figure 1:
FIG. 1 is a front perspective view of apparel bearing lighting, in accordance with one or more element and/or embodiment of the subject disclosure.

The subject innovation is a new way to show your team spirit and represent individual fashion sense. As seen in FIG. 1, the lighting element 12 may be attached to any garment 14, and is a cool, easy-to-use, light-up accessory that can go with any outfit. To boot, the logo 16 representing your team, organization, or personal style may be changed or interchangeable, allowing for additional utility.

In the US alone there are 32 NFL teams, 30 MLB teams, 30 NBA teams, NHL 32, MLS 22, and that's just detailing professional teams. As can be appreciated, the subject innovation would apply to all the school sports in the United States, and beyond. Furthermore, the Olympics would be another great place to show your team spirit for your country.

The subject lighting element 12 is a device that will attach to any clothing garment 14, including jackets, sports jerseys, sweaters, hoodies, shirts, scarfs, purses, backpacks, handbags, hats and the like. The lighting element 12 comprises a hollow vessel 18 constructed of an outer wall 20, an inner wall 22, and an adjoining wall 30 perpendicular to the outer wall 20 and inner wall 22, whereas the adjoining wall 30 connects the inner wall 22 to the outer wall 20. The hollow vessel 18 may be a see-through or opaque to allow for light transmission. The hollow vessel 18 houses LED lights 24, or any other suitable light source, and a power source 26 for operating the LED lights 24 (e.g. battery). In additional embodiment, the power source or light source may have an electrical connection for charging the power source or light source (e.g. usb port).

The inner wall 22 comprises a means for attaching the lighting element 12 to a garment 14. The attachment means may comprise of magnets, snaps, pins, safety pin, hook-and-loop type fasteners, or other fastening means know in the art.

To accommodate various styles and sizes of logos, the lighting element 12 may be a variety of shapes and sizes.

Figure 2:
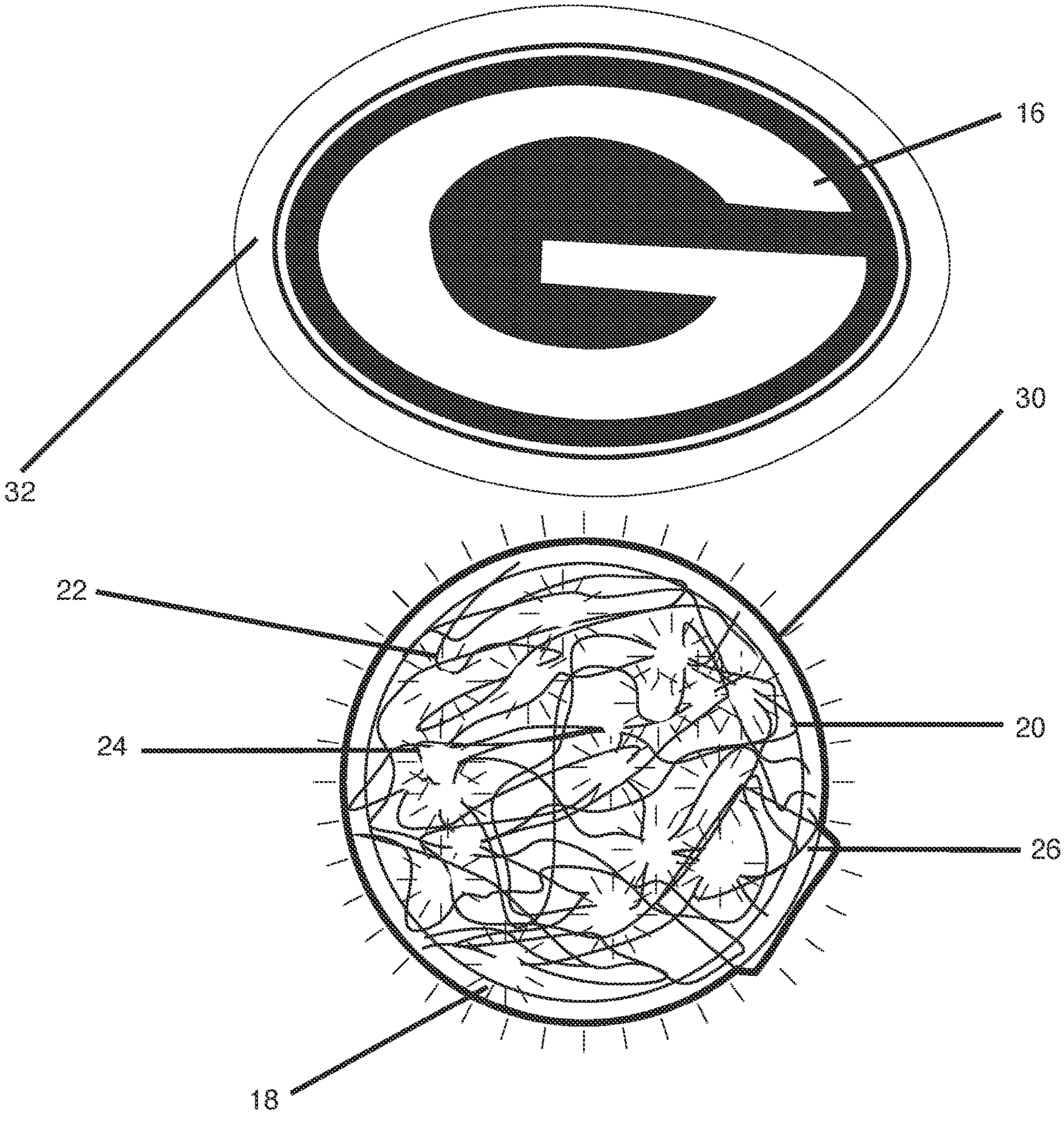
FIG. 2 illustrates a perspective view of the lighting element detached from the apparel, in accordance with one or more element and/or embodiment of the subject disclosure.

Alternatively, the lighting element 12 may be augmented by an interchangeable disc 32, as see in FIG. 2, wherein the disc can easily attached and detach to the lighting element 12. The disc 32 is intended to house a single logo 16, and allows the end user to change the disc to accommodate different teams/logos without purchasing additional lighting elements 12. Although a circular hollow vessel 18 has been depicted herein, numerous other shapes are readily available for use and easily adaptable to the subject innovation.

Figure 3:
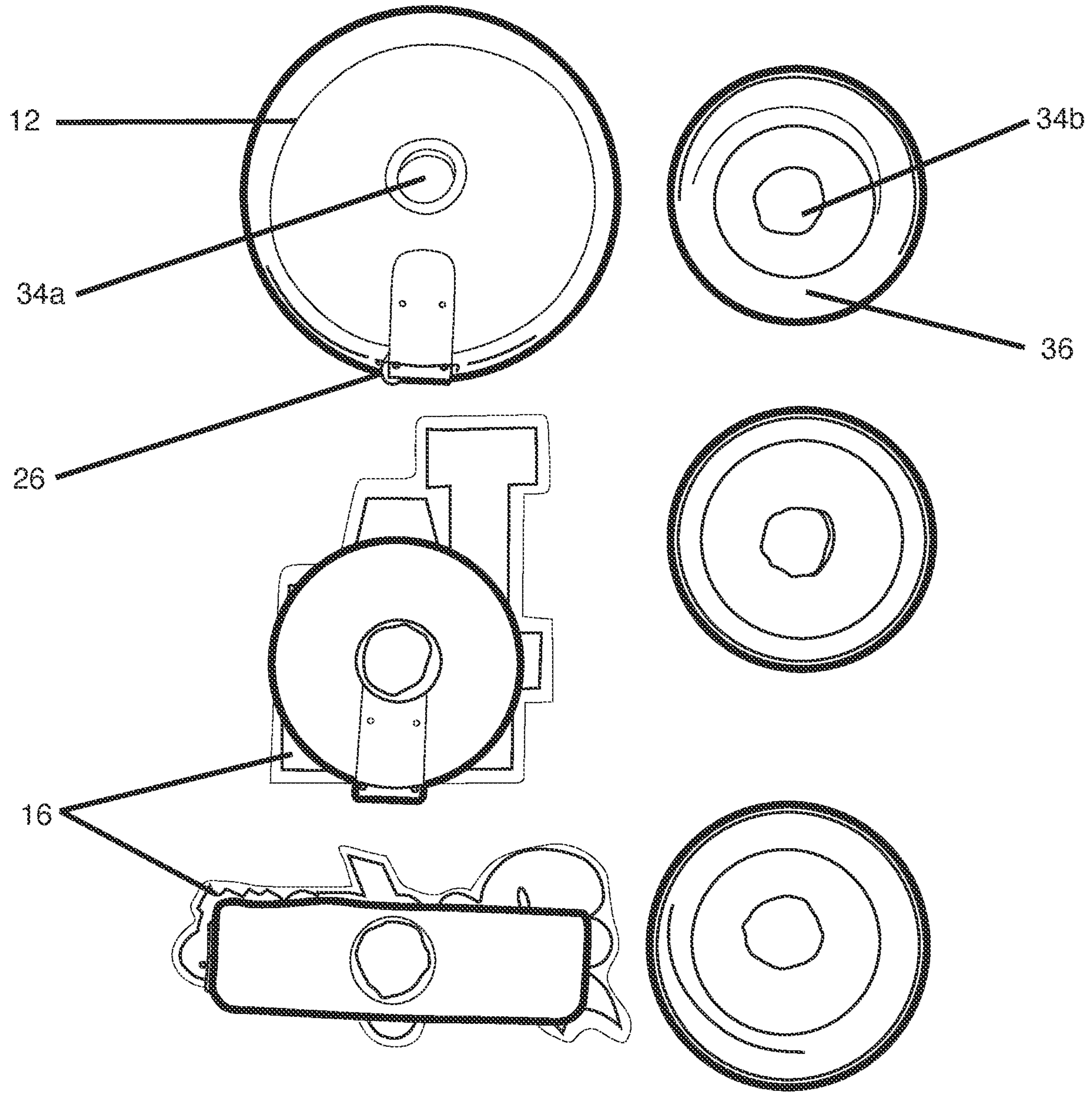
FIG. 3 provides an exploded view of the apparel bearing lighting, in accordance with one or more element and/or embodiment of the subject disclosure.
Figure 4:
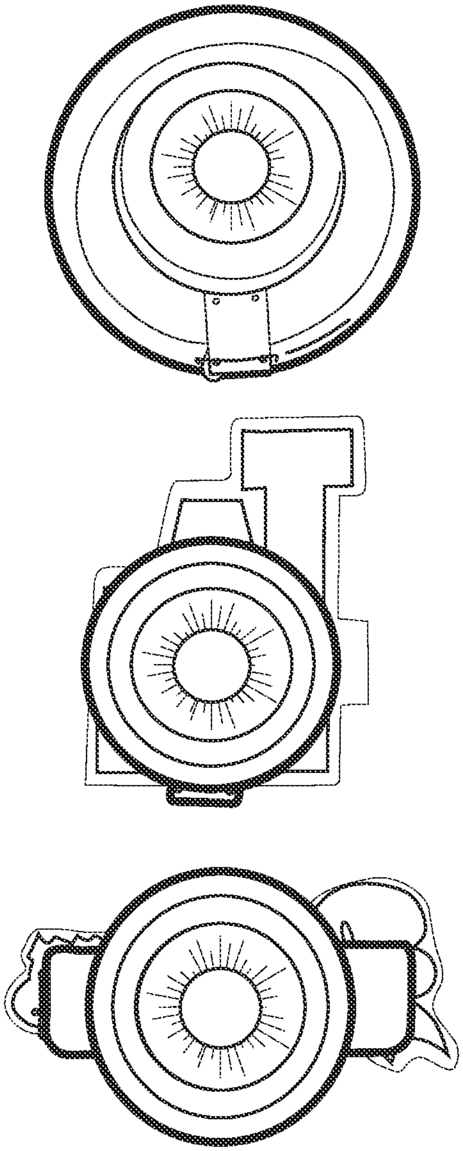
FIG. 4 discloses a rear view of three independent lighting elements detached from the apparel, in accordance with one or more element and/or embodiment of the subject disclosure.

As seen in FIG. 3, the subject innovation utilizes powerful magnets 34 to attach the back of the inner wall 22 to a garment 14. In this exemplary embodiment, the inner wall 22 was a first magnet 34*a*, and a second magnet 34*b* is used to entrap the garment 14 between the two magnets 34*a* and 34*b*. In other embodiments, the first magnet or second magnet may be replaced with a metallic element to entrap the garment. Furthermore, as can be seen in FIG. 3, the second magnet 34*b* includes a plastic surround 36 for displacing the force of the magnet to a larger segment of the garment for additional security of attachment.

Furthermore, the subject lighting element is adapted to allow for individuals to create their own logo/sticker for placement on the lighting element 12, which may then be attached to garment 14. End users are encouraged to get creative and submit their own styles in the parameters of our measurements—you can easily customize exactly what you want and get it delivered right to your door. Decal stickers, sports teams, superheroes, businesses, favorite bands, heart-throbs, advertisements . . . the options are unlimited! Our unique design also is great for promotional giveaways, amusement park prizes, and special work and business events, to name a few.

The invention claimed is:

1. An apparatus for attachment to apparel, comprising:
- a hollow enclosed vessel containing a light source;
- an attachment means for attaching the hollow enclosed vessel to an inside side of the apparel; and
- a disc removably attached to the hollow enclosed vessel for displaying a logo,
- wherein the disc is removably attached to an outside side of the apparel.

2. The apparatus for claim 1, wherein the attachment means is a magnet.

3. The apparatus of claim 1, wherein the light source is a light-emitting diode.

4. The apparatus of claim 1, further comprising a power source for powering the light source.

5. The apparatus of claim 1, wherein the apparatus attaches to the outside of the apparel.

6. The apparatus of claim 1, further comprising an electrical connection for charging a power source or the light source.

7. The apparatus of claim 1, wherein the disc comprises an inner sheet and an outer sheet parallel to the inner sheet a distance from each other, wherein the inner sheet and outer sheet are attached to each other at at least the bottom half of the sheets.

8. The apparatus of claim 7, wherein the distance between the parallel sheets creates a gap to removably accept a decal.

* * * * *